United States Patent
Jang et al.

(10) Patent No.: US 12,546,889 B2
(45) Date of Patent: Feb. 10, 2026

(54) SENSOR INFORMATION FUSION METHOD AND APPARATUS

(71) Applicants: Hyundai Motor Company, Seoul (KR); Kia Corporation, Seoul (KR)

(72) Inventors: Sung Moon Jang, Seongnam-si (KR); Bo Young Yun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 345 days.

(21) Appl. No.: 18/063,175

(22) Filed: Dec. 8, 2022

(65) Prior Publication Data

US 2023/0258797 A1 Aug. 17, 2023

(30) Foreign Application Priority Data

Feb. 15, 2022 (KR) .................. 10-2022-0019415

(51) Int. Cl.
| | |
|---|---|
| *G01S 13/931* | (2020.01) |
| *G01S 13/86* | (2006.01) |
| *G01S 17/86* | (2020.01) |
| *G01S 17/931* | (2020.01) |

(52) U.S. Cl.
CPC .......... *G01S 13/931* (2013.01); *G01S 13/865* (2013.01); *G01S 13/867* (2013.01); *G01S 17/86* (2020.01); *G01S 17/931* (2020.01)

(58) Field of Classification Search
None
See application file for complete search history.

(56) References Cited

U.S. PATENT DOCUMENTS

| | | | | |
|---|---|---|---|---|
| 5,138,321 | A * | 8/1992 | Hammer | G01S 13/87 342/36 |
| 5,964,822 | A * | 10/1999 | Alland | G01S 13/931 701/96 |
| 7,009,554 | B1 * | 3/2006 | Mookerjee | G01S 13/878 342/195 |
| 7,719,461 | B1 * | 5/2010 | Mookerjee | G01S 7/003 342/135 |
| 10,929,694 | B1 | 2/2021 | Zhang et al. | |
| 2014/0139367 | A1 * | 5/2014 | Song | G01S 13/723 342/61 |
| 2019/0204434 | A1 * | 7/2019 | Novoselsky | G01S 13/723 |
| 2020/0141698 | A1 * | 5/2020 | Lam | F41G 3/04 |
| 2020/0312156 | A1 * | 10/2020 | Sakamaki | G08G 5/723 |
| 2021/0103027 | A1 | 4/2021 | Harrison | |
| 2021/0295090 | A1 | 9/2021 | Kum et al. | |

(Continued)

FOREIGN PATENT DOCUMENTS

| | | | |
|---|---|---|---|
| JP | 2010071942 | A | 4/2010 |
| KR | 20100129410 | A | 12/2010 |

(Continued)

*Primary Examiner* — Bernarr E Gregory
(74) *Attorney, Agent, or Firm* — Slater Matsil, LLP

(57) ABSTRACT

An embodiment sensor information fusion method includes acquiring a first sensor track from a first sensor mounted in a vehicle and setting a reference sector based on the first sensor track, selecting at least one target track included in the reference sector, and comparatively analyzing an angle between the at least one target track and the first sensor track and generating a fusion track through fusion with the first sensor track based on an analysis result value.

20 Claims, 8 Drawing Sheets

(56) References Cited

U.S. PATENT DOCUMENTS

| | | | | |
|---|---|---|---|---|
| 2022/0128680 A1* | 4/2022 | Bauch | ................... | G01S 15/931 |
| 2022/0130109 A1* | 4/2022 | Arbabian | ............... | G01S 13/867 |
| 2022/0163656 A1* | 5/2022 | Novoselsky | .......... | G01S 13/726 |

FOREIGN PATENT DOCUMENTS

| | | | |
|---|---|---|---|
| KR | 101188584 | B1 | 10/2012 |
| KR | 102151815 | B1 | 9/2020 |
| KR | 102175947 | B1 | 11/2020 |

\* cited by examiner

SENSOR INFORMATION FUSION METHOD AND APPARATUS

CROSS-REFERENCE TO RELATED APPLICATIONS

This application claims the benefit of Korean Patent Application No. 10-2022-0019415, filed on Feb. 15, 2022, which application is hereby incorporated herein by reference.

TECHNICAL FIELD

The present invention relates to a sensor information fusion method and apparatus.

BACKGROUND

An autonomous driving system of a vehicle fuses information from different kinds of sensors so as to overcome performance limits of the respective sensors, and thereby, acquires more robust autonomous driving recognition information. However, despite this effort, a sensor performance limit situation still exists, and pedestrian recognition performance is a representative example of limited sensor performance.

A pedestrian has a small reflection area, moves at a low speed, and easily changes a direction of motion compared to a vehicle, and thus, it is difficult to predict the dynamic characteristics of the pedestrian. Because of these characteristics, the respective sensors have difficulty stably recognizing pedestrians compared to vehicles, to greater or less degrees.

Particularly, in order to increase stability and reliability of an autonomous driving system having level 3 or higher, improvement in pedestrian recognition performance is absolutely required. The reason for this is that, as an area controlled by the autonomous driving system instead of a driver increases, the autonomous driving system should perform autonomous driving control so as to recognize a pedestrian, to forewarn the driver of the pedestrian, and to ensure the safety of the pedestrian.

Laws and regulations related to autonomous driving, which are being enacted now, also tend to increase articles related to the response of autonomous driving systems to pedestrians.

For example, sensors other than Light Detection and Ranging (LiDAR) have very low positional accuracy with respect to pedestrians, pedestrian classification depends solely on a camera sensor, and only Radio Detection and Ranging (RaDAR) has a proper level of accuracy in speed information. That is, the respective sensors have no common characteristics with respect to pedestrians compared to vehicles, and it is difficult to prepare references to fuse information.

For example, in case of a vehicle, the RaDAR, the camera, and the LiDAR have differences in detection performance of position information of the vehicle, but respective sensor track position information is within an error range to some extent and thus outputs of the respective sensors with respect to the same target are fused based on this.

However, in case of a pedestrian, position information of the pedestrian acquired by the RaDAR and the camera is very inaccurate, and thus, it is difficult to determine whether or not RaDAR and camera tracks are outputs with respect to the same pedestrian as a LiDAR track.

SUMMARY

The present invention relates to a sensor information fusion method and apparatus. Particular embodiments relate to a sensor information fusion method and apparatus which may accurately fuse pedestrian position, classification and speed information through fusion of LiDAR, RaDAR, and camera sensors with respect to a pedestrian.

Accordingly, embodiments of the present invention are directed to a sensor information fusion method and apparatus that substantially obviate one or more problems due to limitations and disadvantages of the related art.

An embodiment of the present invention provides a sensor information fusion method and apparatus which may accurately and reliably fuse pedestrian position, classification, and speed information through fusion of LiDAR, RaDAR, and camera sensors with respect to a pedestrian.

Additional advantages, objects, and features of embodiments of the invention will be set forth in part in the description which follows and in part will become apparent to those having ordinary skill in the art upon examination of the following, or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of embodiments of the invention, as embodied and broadly described herein, a sensor information fusion method includes acquiring a first sensor track from a first sensor mounted in a vehicle and setting a reference sector based on the first sensor track, selecting at least one target track included in the reference sector, and comparatively analyzing an angle between the at least one selected target track and the first sensor track and generating a fusion track through fusion with the first sensor track based on an analysis result value.

The setting the reference sector may include calculating first azimuth information from the first sensor track, extracting resolution from the calculated first azimuth information, and setting the reference sector based on the extracted resolution.

The selecting the at least one target track may include acquiring at least one second sensor track from a second sensor different from the first sensor, determining whether or not the at least one second sensor track is located inside the reference sector, and setting at least one second sensor track determined to be located inside the reference sector to the at least one target track.

The at least one target track may include a first target track located inside the reference sector and a second target track located at a different position from the first target track inside the reference sector, and the generating the fusion track may include comparatively analyzing a first angle calculated between the first target track and the first sensor track and a second angle calculated between the second target track and the first sensor track, and generating a first fusion track by fusing the first sensor track and the first target track or a second fusion track by fusing the first sensor track and the second target track, based on comparative analysis results.

In the generating the fusion track, the first fusion track may be generated by fusing the first target track with the first sensor track, when the first angle is less than the second angle, as the comparative analysis results.

In the generating the fusion track, the second fusion track may be generated by fusing the second target track with the first sensor track, when the first angle is greater than the second angle, as the comparative analysis results.

The selecting the at least one target track may further include acquiring at least one third sensor track from a third sensor different from the second sensor, determining whether or not the at least one third sensor track is located inside the reference sector, and setting at least one third sensor track determined to be located inside the reference sector to the at least one target track.

The at least one target track may further include a third target track located inside the reference sector and a fourth target track located at a different position from the third target track inside the reference sector, and the generating the fusion track may further include comparatively analyzing a first distance calculated between the third target track and the first target track and a second distance calculated between the fourth target track and the first target track, and generating a third fusion track by fusing the first target track and the third target track or a fourth fusion track by fusing the first target track and the fourth target track.

In the generating the fusion track, the third fusion track may be generated by fusing the third target track with the first target track, when the first distance is less than the second distance, as the comparative analysis results.

In the generating the fusion track, the fourth fusion track may be generated by fusing the fourth target track with the first target track, when the first distance is greater than the second distance, as the comparative analysis results.

The at least one target track may exclude the first target track and the second target track configured not to be located inside the reference sector and may include a third target track located inside the reference sector and a fourth target track located at a different position from the third target track inside the reference sector, and the generating the fusion track may further include analyzing third azimuth information calculated from the third target track and fourth azimuth information calculated from the fourth target track through comparison between the first azimuth information and each of the third azimuth information and the fourth azimuth information, and generating a fifth fusion track by fusing the first sensor track and the third target track, when the third azimuth information is equal to the first azimuth information, as comparative analysis results.

The generating the fusion track may further include generating the fusion track based on the first sensor track, when the third azimuth information or the fourth azimuth information is not equal to the first azimuth information, as the comparative analysis results.

In another embodiment of the present invention, a computer readable recording medium having recorded thereon a program to execute the sensor information fusion method is provided.

In yet another embodiment of the present invention, a sensor information fusion apparatus includes a first sensor configured to acquire a first sensor track with respect to an object around a vehicle and a fusion controller configured to set a reference sector based on the first sensor track provided by the first sensor and to select at least one target track included in the reference sector, wherein the fusion controller comparatively analyzes an angle between the at least one selected target track and the first sensor track and generates a fusion track through fusion with the first sensor track based on an analysis result value.

The fusion controller may calculate first azimuth information from the first sensor track, may extract resolution from the calculated first azimuth information, and may set the reference sector based on the extracted resolution.

The sensor information fusion apparatus may further include a second sensor configured to acquire at least one second sensor track with respect to the object around the vehicle and a third sensor configured to acquire at least one third sensor track with respect to the object around the vehicle, and the fusion controller may determine whether or not at least one of the at least one second sensor track or the at least one third sensor track is located inside the reference sector, and may set at least one sensor track determined to be located inside the reference sector to the at least one target track.

The at least one target track may include a first target track located inside the reference sector and a second target track located at a different position from the first target track inside the reference sector, and the fusion controller may comparatively analyze a first angle calculated between the first target track and the first sensor track and a second angle calculated between the second target track and the first sensor track, and may generate a first fusion track by fusing the first sensor track and the first target track or a second fusion track by fusing the first sensor track and the second target track, based on comparative analysis results.

The at least one target track may further include a third target track located inside the reference sector and a fourth target track located at a different position from the third target track inside the reference sector, and the fusion controller may comparatively analyze a first distance calculated between the third target track and the first target track and a second distance calculated between the fourth target track and the first target track, and may generate a third fusion track by fusing the first target track and the third target track or a fourth fusion track by fusing the first target track and the fourth target track.

The at least one target track may exclude the first target track and the second target track configured not to be located inside the reference sector and may include a third target track located inside the reference sector and a fourth target track located at a different position from the third target track inside the reference sector, and the fusion controller may analyze third azimuth information calculated from the third target track and fourth azimuth information calculated from the fourth target track through comparison between the first azimuth information and each of the third azimuth information and the fourth azimuth information, and may generate a fifth fusion track by fusing the first sensor track and the third target track, when the third azimuth information is equal to the first azimuth information, as comparative analysis results.

The fusion controller may generate the fusion track based on the first sensor track, when the third azimuth information or the fourth azimuth information is not equal to the first azimuth information, as the comparative analysis results.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

Reference will now be made in detail to the exemplary embodiments of the present invention, examples of which are illustrated in the accompanying drawings. However, the embodiments of the present invention may be implemented in various different forms, and the scope of the present invention is not limited to the embodiments disclosed hereinafter. The embodiments of the present invention are provided to make the description of the present invention thorough and to fully convey the scope of the present invention to those skilled in the art.

In the following description of the embodiments, it will be understood that, when positional relationships are expressed, for example, when an element is said to be "on" or "under" another element, the two elements may directly contact each other, or one or more other elements may be interposed between the two elements, unless the term "immediately" or "directly" is used.

Further, it will be understood that spatially relative terms, such as "on", "under" and the like, can encompass both an orientation of above and below one element.

In addition, it will be understood that the relational terms "first", "second", "on"/"above" and "under"/"below", etc. may not always require or encompass any physical or logical relations between substances or elements or the order thereof, and may be used only to distinguish any substance or element from other substances or elements.

Hereinafter, a sensor information fusion method according to one embodiment of the present invention will be described with reference to the accompanying drawings. Although, for convenience, the sensor information fusion method will be described using the Cartesian coordinate system (the x-axis, the y-axis and the z-axis being applied), the sensor information fusion method may be described based on other coordinate systems.

Figure 1:
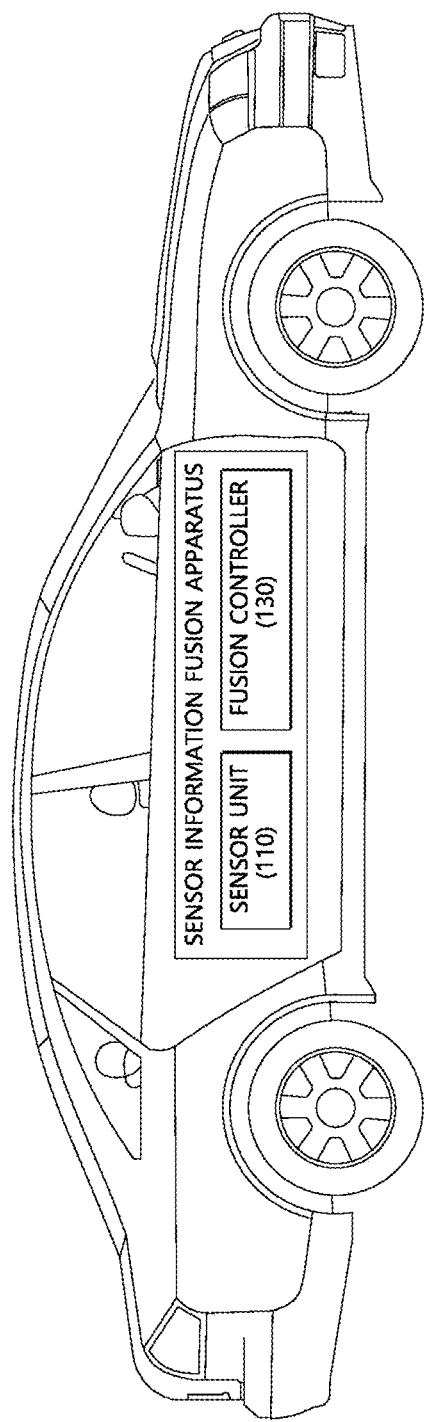
FIG. 1 is a diagram illustrating a vehicle to which a sensor information fusion apparatus according to one embodiment of the present invention is applied.

FIG. 1 is a diagram illustrating a vehicle to which a sensor information fusion apparatus according to one embodiment of the present invention is applied.

As shown in FIG. 1, a vehicle may be provided with a sensor information fusion apparatus 100. The sensor information fusion apparatus 100 may include a sensor unit 110 and a fusion controller 130.

The sensor unit 110 may sense an object outside the vehicle. The sensor unit 110 may include one or more sensors configured to acquire information about a target object located around the vehicle. For example, the sensor unit no may include first to third sensors.

The sensor unit 110 may acquire at least one of information, such as the position of the target object, the moving speed of the target object, the moving direction of the target object, and the kind of the target object (for example, a vehicle, a pedestrian, a bicycle, a motorcycle or the like) depending on the kind of the sensor. For example, the sensor unit 110 may include various sensors, such as an ultrasonic sensor, Radio Detection and Ranging (RaDAR), a camera, a laser scanner, and Light Detection and Ranging (LiDAR). For example, the camera may be referred to as a first sensor, the LiDAR may be referred to as a second sensor, and the RaDAR may be referred to as a third sensor.

The fusion controller 130 may recognize an object by fusing sensor information acquired by the sensor unit 110. The fusion controller 130 may detect the object by processing detection points input from the respective sensors of the sensor unit 110, and may predict track information based on the detected object. For example, the fusion controller 130 may receive sensor tracks provided from the sensor unit 110, may set a reference sector based on the sensor tracks, and may select at least one target track included in the reference sector.

The fusion controller 130 may compare the angle of the at least one target track with the angle of a first sensor track, and may generate a fusion track by fusing the at least one target track and the first sensor track based on an analysis result value.

The fusion controller 130 may control a driver assistance and autonomous driving system based on the information of the at least one selected target track or the fusion track. The fusion controller 130 may output a control signal configured to control the driver assistance and autonomous driving system based on a pedestrian recognition result. However, the fusion controller 130 is not limited thereto, and a detailed description of the fusion controller 130 will be given later.

Figure 2:
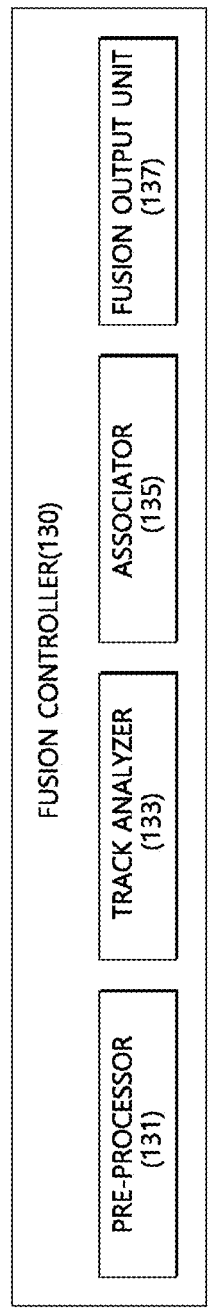
FIG. 2 is a block diagram showing the schematic configuration of the sensor information fusion apparatus according to one embodiment of the present invention.

FIG. 2 is a block diagram showing the schematic configuration of the sensor information fusion apparatus according to one embodiment of the present invention.

Referring to FIG. 2, the fusion controller 130 may include a pre-processor 131, a track analyzer 133, an associator 135, and a fusion output unit 137.

The pre-processor 131 may process the detection points input from the respective sensors into a fusion enabling form. The pre-processor 131 may correct coordinate systems of sensing values or sensing data acquired from the respective sensors into the same reference coordinate system. Further, the pre-processor 131 may remove detection points having data intensity or confidence which is less than a reference through filtering.

The track analyzer 133 may detect an object by processing the detection points input from the respective sensors and may predict track information based on the detected object. Here, a track may be generated in a box type fitting into the outside of the object, and may include information, such as a position, a speed and a class.

Each sensor may output one sensor track with respect to one object. For example, the first sensor may acquire a first sensor track, the second sensor may acquire a second sensor track, and the third sensor may acquire a third sensor track. However, the sensors are not limited thereto and, although the sensors sense the same object, the attributes, such as the sizes, positions, speeds, etc., of the generated sensor tracks may be different depending on characteristics of the respective sensors.

The associator 135 may determine similarity among the sensor tracks generated by the respective sensors and may fuse the sensor tracks into one fusion track. The associator 135 may generate the fusion track in consideration of a distance or an azimuth between central points of a reference track and a target track.

The reference track may be set by choosing or selecting one of the generated sensor tracks. For example, the associator 135 may set the first sensor track out of the first to third sensor tracks as the reference track. When the reference track is set, the associator 135 may set a reference sector based on the reference track. The configuration of the associator 135 will be described in detail below with reference to FIG. 3.

The fusion output unit 137 may output or manage the fusion track generated by the associator 135.

Figure 3:
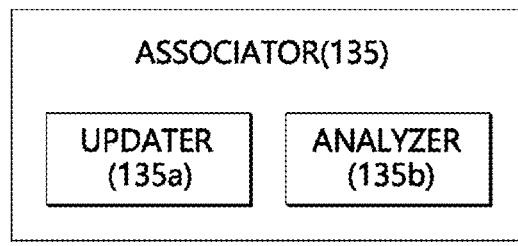
FIG. 3 is a schematic block diagram showing an associator of FIG. 2.

FIG. 3 is a schematic block diagram showing the associator of FIG. 2.

The associator 135 may update a target track to be associated, among gated sensor tracks, and may generate a fusion track having the highest similarity to the real object by calculating a combined cost by reflecting a distance or an azimuth between the reference track and the target track. The associator 135 may set the reference sector based on the reference track under the control of the fusion controller 130, may select at least one target track included in the reference sector, and may generate the fusion track having the highest similarity to the real object based on the at least one target track.

Referring to FIG. 3, the associator 135 may include an updater 135*a* and an analyzer 135*b*.

The updater 135*a* may update the target track to be associated, by determining similarities between the reference track information and predicted track information generated by the respective sensors.

In order to determine similarities, the associator 135 may set a gate based on the reference track, and may determine whether or not a reference point of the target track is located inside the gate. The gate may be referred to as the reference sector. That is, the associator 135 may set the reference sector based on the reference track under the control of the fusion controller 130 and may select at least one target track inside the set reference sector.

The reference track may be the sensor track generated by one of a plurality of sensors, and a method for setting the sensor configured to generate the reference track may be set in advance. The sensor track may be referred to as a track. However, the present invention is not limited thereto, and a fusion track generated at a previous point in time may be set as the reference track depending on a surrounding environment or circumstances.

The gate may be a region set based on the reference track, and the sensor tracks, degrees of association of which will be calculated, may be selected depending on whether or not the reference points of the target tracks are located inside the gate.

When the reference point of the target track is located inside the gate under the control of the fusion controller 130, the associator 135 may update the target track of a corresponding sensor to a target, association of which with the reference track is to be calculated. When the reference point of the target track is located outside the gate, the associator 135 may determine that the target track of the corresponding sensor is not associated with the reference track, and may thus remove the target track.

The analyzer 135*b* may mathematically calculate degrees of association between target tracks located inside the reference track and the reference track, and may thus select a target track having the highest probability that the target track and the reference track are tracks with respect to the same object.

The analyzer 135*b* may analyze an azimuth and a distance between the reference track and the target track and may calculate an analysis result value. The analysis result value may be referred to as a cost. The analysis result value may be a value which is mathematically calculated so as to show similarity between two sensor tracks. For example, the analyzer 135*b* may calculate the analysis result value using the Euclidean distance or the Mahalanobis distance between the two sensor tracks under the control of the fusion controller 130. For example, the analyzer 135*b* may determine that the probability that the two sensor tracks are tracks with respect to the same object is increased as the azimuth between the two sensor tracks decreases and as the distance between the two sensor tracks decreases under the control of the fusion controller 130. Therefore, the analyzer 135*b* may select the target track having a small analysis result value under the control of the fusion controller 130. The target track may be referred to as an association track.

As described above, in order to select a sensor track having the highest probability that the sensor track and the reference track are tracks with respect to the same object, the sensor information fusion apparatus wo according to one embodiment may comparatively analyze an azimuth or a distance between the reference track and a target track and may calculate an analysis result value, thereby being capable of improving accuracy of a fusion track.

Further, one embodiment of the present invention may improve fusion performance between different kinds of sensors, and particularly, may improve fusion performance between sensors having similar attributes of raw data of sensor information.

Figure 4:
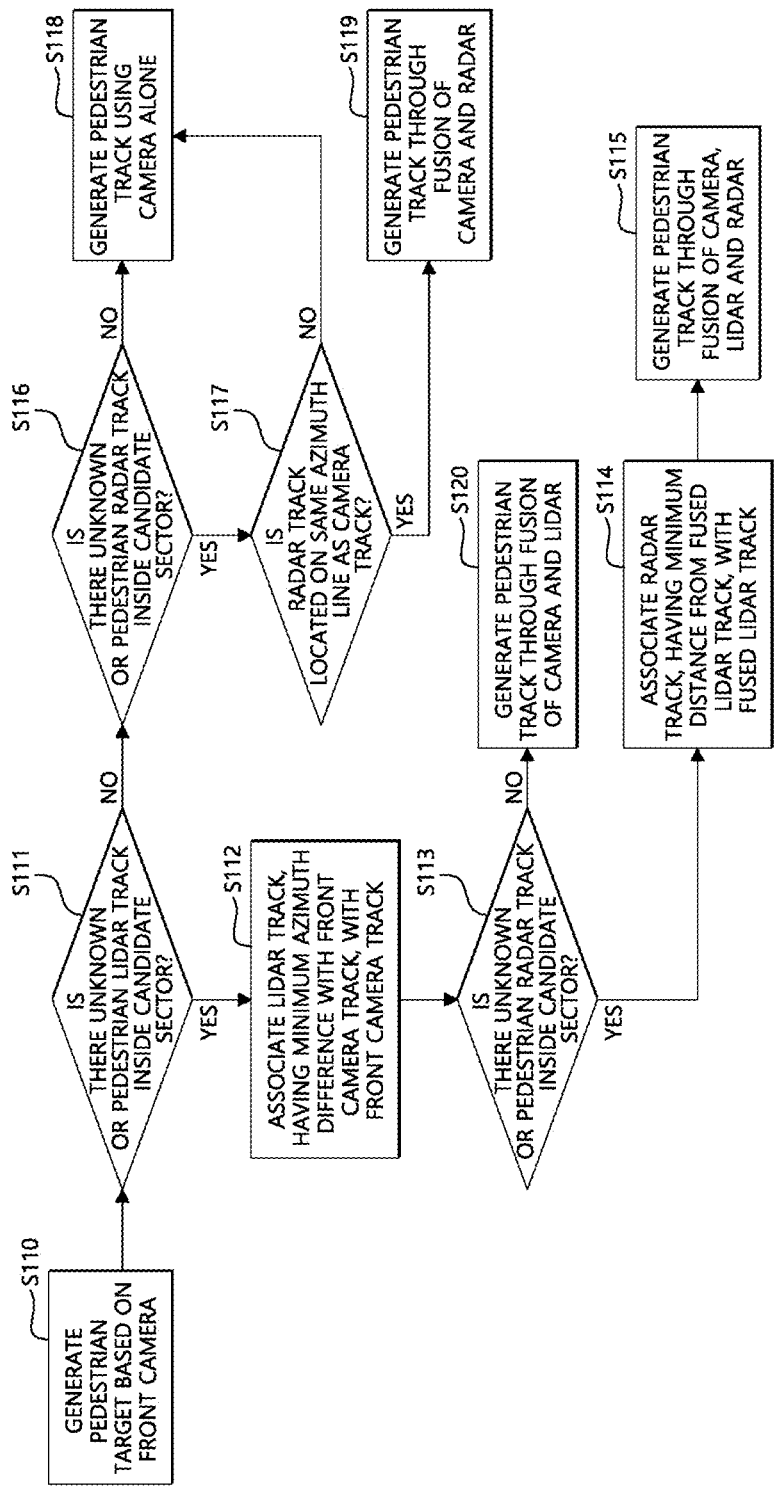
FIG. 4 is a flowchart representing a sensor information fusion method according to one embodiment of the present invention.

FIG. 4 is a flowchart representing a sensor information fusion method according to one embodiment of the present invention, and FIGS. 5 to 8 are diagrams illustrating an example of the sensor information fusion method according to one embodiment of the present invention.

Referring to FIG. 4, the sensor information fusion method according to one embodiment of the present invention will be described below.

First, a first sensor track may be acquired from a first sensor mounted in a vehicle, and a reference sector may be set based on the first sensor track (S110). The first sensor may be a camera or a front camera. The fusion controller 130 (with reference to FIG. 2) may receive sensor data or a sensor value provided by the first sensor and may acquire the first sensor track based on the received sensor data or sensor value. For example, the fusion controller 130 (with reference to FIG. 2) may set or generate a target as a pedestrian located in front of the vehicle based on a captured image provided by the front camera.

The fusion controller 130 (with reference to FIG. 2) may set a reference sector based on the generated pedestrian target. The fusion controller 130 (with reference to FIG. 2) may calculate first azimuth information through the first sensor track and may extract resolution from the calculated first azimuth information.

The fusion controller 130 (with reference to FIG. 2) may set the reference sector based on the extracted resolution. The reference sector may be referred to as a candidate sector or a gate. The reference sector may be a designated region set centering around a designated reference point on a reference track.

The fusion controller 130 (with reference to FIG. 2) may set a central point on the first sensor track and may calculate the first azimuth information based on the central point on the first sensor track.

Figure 5:
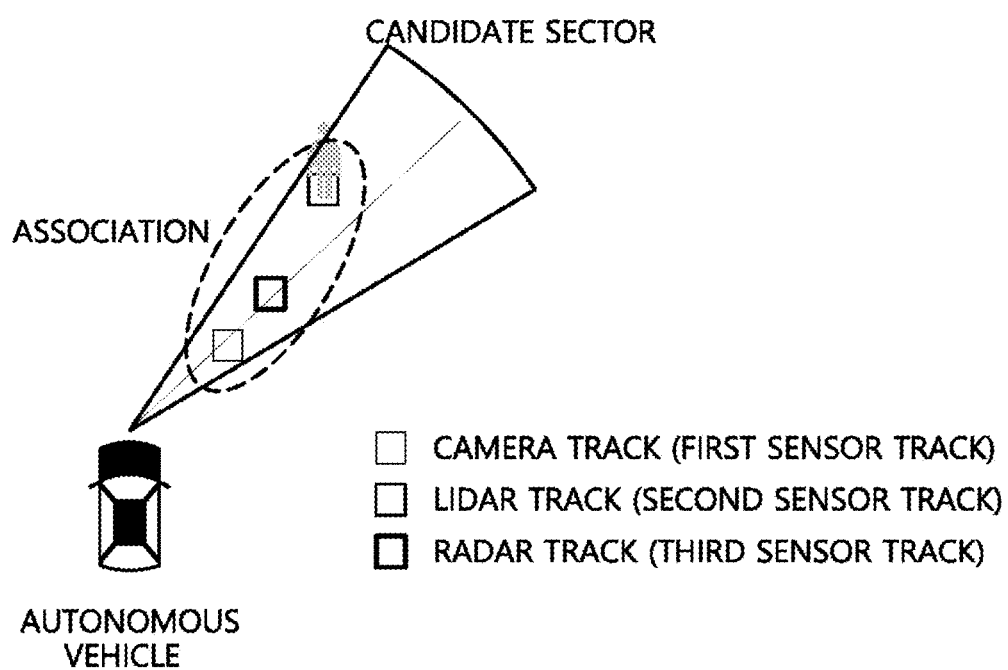
FIGS. 5 to 8 are diagrams illustrating an example of the sensor information fusion method according to one embodiment of the present invention.

Referring to FIG. 5, in embodiments of the present invention, in order to minimize inaccuracy in position information of the camera serving as the first sensor and the RaDAR serving as a third sensor, the reference sector, i.e., the candidate sector, may be formed using azimuth information of the camera. The fusion controller 130 (with reference to FIG. 2) may control the azimuth of the candidate sector so as to correspond to the azimuth resolution of the camera. For example, the fusion controller 130 (with reference to FIG. 2) may set the azimuth of the candidate sector to 2 degrees, when the azimuth resolution of the camera is 2 degrees. Here, the corresponding value may be optimized through tuning.

The fusion controller 130 (with reference to FIG. 2) may select at least one target track included in the reference sector. The fusion controller 130 (with reference to FIG. 2) may select at least one target track included in the reference sector set through a second sensor or the third sensor rather than the first sensor. The second sensor may be LiDAR and the third sensor may be the RaDAR. The target track may be expressed as a pedestrian or an unknown.

The fusion controller 130 (with reference to FIG. 2) may acquire at least one second sensor track from the second sensor different from the first sensor and may determine whether or not the at least one second sensor track is located inside the reference sector (S111). The fusion controller 130 (with reference to FIG. 2) may set at least one second sensor track located inside the reference sector as a target track, as a result of determination.

Here, the target tracks may include a first target track located inside the reference sector and a second target track located at a different position from the first target track inside the reference sector.

That is, referring to FIG. 5, when the second sensor track, i.e., a LiDAR track, classified into the pedestrian or the unknown exists inside the reference sector, i.e., the candidate sector, the fusion controller 130 (with reference to FIG. 2) may control association of the camera, RaDAR and LiDAR tracks inside the corresponding candidate sector (S112).

Figure 6:
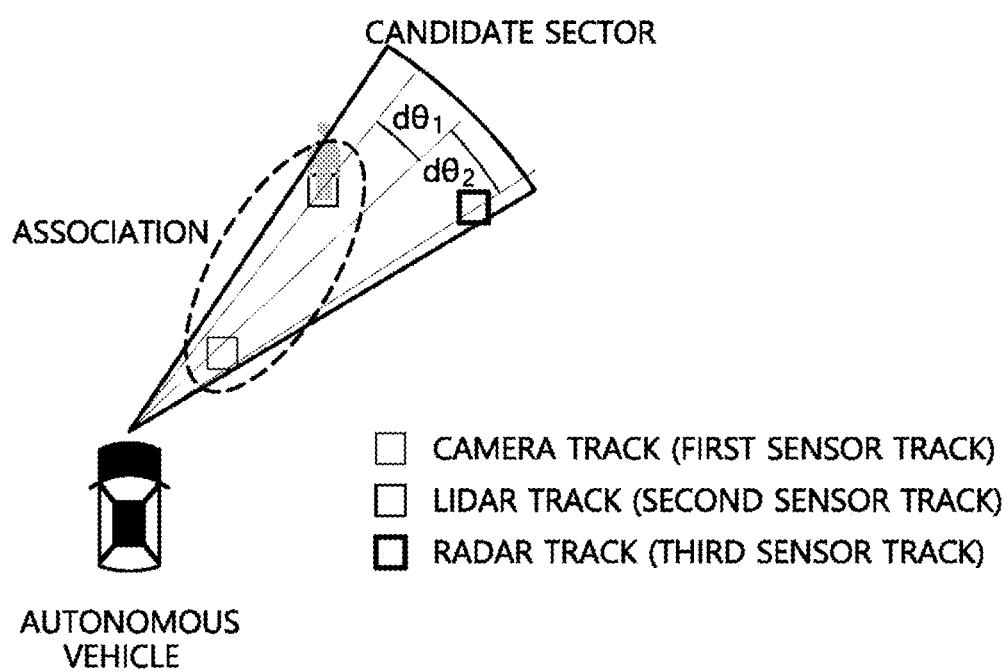

Referring to FIG. 6, the fusion controller 130 (with reference to FIG. 2) may comparatively analyze an angle between the at least one selected target track and the first sensor track and may generate a fusion track by fusing the at least one target track with the first sensor track based on analysis result values.

The fusion controller 130 (with reference to FIG. 2) may comparatively analyze a first angle calculated between the first target track and the first sensor track and a second angle calculated between the second target track and the first sensor track. The fusion controller 130 (with reference to FIG. 2) may generate a first fusion track by fusing the first sensor track and the first target track or a second fusion track by fusing the first sensor track and the second target track based on comparative analysis results.

The fusion controller 130 (with reference to FIG. 2) may generate the first fusion track by fusing the first target track with the first sensor track, when the first angle is less than the second angle as the comparative analysis results.

When the second target track, which is a LiDAR target, classified into another pedestrian or unknown further exists in the candidate sector, i.e., when LiDAR targets classified into a plurality of pedestrians or unknowns, as described above, exist in the candidate sector, the fusion controller 130 (with reference to FIG. 2) may select the first target track, i.e., a track having an azimuth difference dθ1 less than an azimuth difference dθ2.

However, the present invention is not limited thereto, and the fusion controller 130 (with reference to FIG. 2) may generate the second fusion track by fusing the second target track with the first sensor track, when the first angle is greater than the second angle.

Thereafter, the fusion controller 130 (with reference to FIG. 2) may acquire at least one third sensor track from the third sensor different from the second sensor, and may determine whether or not the at least one third sensor track is located inside the reference sector (S113). The fusion controller 130 (with reference to FIG. 2) may determine at least one third sensor track located inside the reference sector as a target track, as a result of determination.

The fusion controller 130 (with reference to FIG. 2) may generate a fusion pedestrian track by associating the camera track and the LiDAR track with each other (S120), when no third sensor track is located inside the reference sector, as the result of determination. That is, the fusion controller 130 (with reference to FIG. 2) may generate the fusion pedestrian track by associating the camera track and the LiDAR track inside the candidate sector with each other, when the LiDAR track classified as the unknown or the pedestrian exists in the candidate sector and the RaDAR target does not exist in the corresponding candidate sector (S120).

Here, the target tracks may include a third target track located inside the reference sector and a fourth target track located at a different position from the third target track inside the reference sector.

The fusion controller 130 (with reference to FIG. 2) may comparatively analyze a first distance calculated between the third target track and the first target track and a second distance calculated between the fourth target track and the first target track, and may generate a third fusion track by fusing the third target track with the first target track or a fourth fusion track by fusing the fourth target track with the first target track based on comparative analysis results.

The fusion controller 130 (with reference to FIG. 2) may generate the third fusion track by fusing the third target track with the first target track, when the first distance is less than the second distance as the comparative analysis results.

Figure 7:
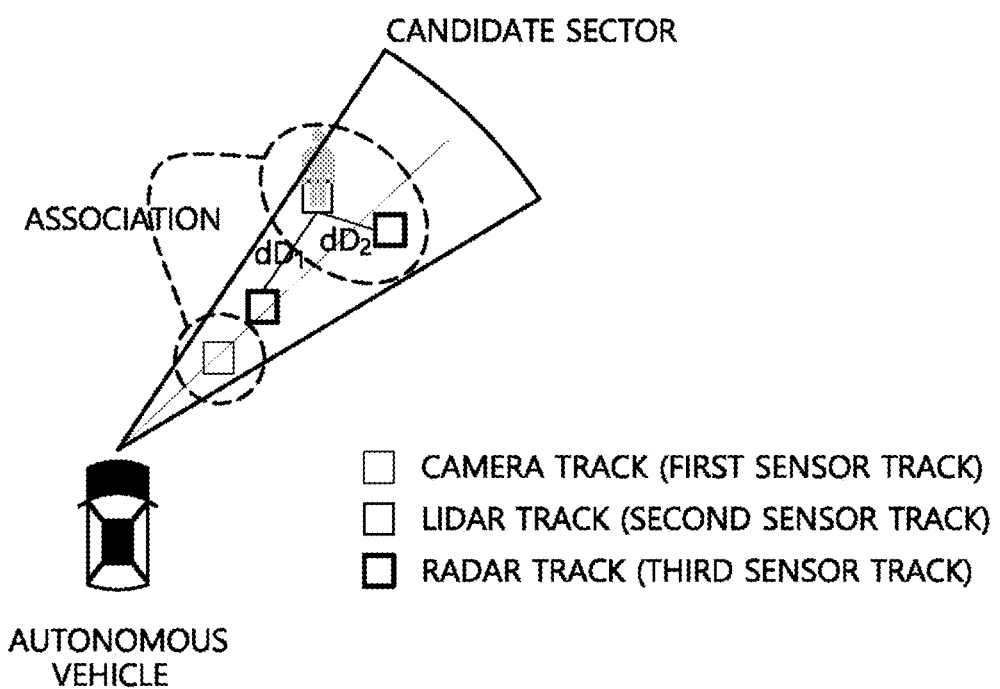

Referring to FIG. 7, when the fourth target track, which is a RaDAR target, classified into another pedestrian or unknown further exists in the candidate sector, i.e., when RaDAR targets classified into a plurality of pedestrians or unknowns exist in the candidate sector, as described above, the fusion controller 130 (with reference to FIG. 2) may select one of the third target track and the fourth target track having a smaller distance difference with the LiDAR track (i.e., dD1 vs dD2) (S114).

However, the present invention is not limited thereto, and the fusion controller 130 (with reference to FIG. 2) may generate the fourth fusion track by fusing the fourth target track with the first target track, when the first distance is greater than the second distance.

The fusion controller 130 (with reference to FIG. 2) may calculate distances using the Euclidean distance or the Mahalanobis distance. However, the fusion controller 130 (with reference to FIG. 2) is not limited thereto and may calculate distances using various equations.

As described above, the fusion controller 130 (with reference to FIG. 2) may generate the fusion pedestrian track through association of the camera track, the LiDAR track and RaDAR track inside the candidate sector, when the LiDAR track and the RaDAR target classified as an unknown or a pedestrian exist in the corresponding candidate sector (S115).

Further, the fusion controller 130 (with reference to FIG. 2) may exclude the first target track and the second target track which are not located inside the reference sector (No in S111), and may use the third target track and the fourth target track which are located inside the reference sector to the target tracks (S116).

The fusion controller 130 (with reference to FIG. 2) may analyze third azimuth information calculated from the third target track and fourth azimuth information calculated from the fourth target track through comparison with the first azimuth information, and may generate a fifth fusion track by fusing the first sensor track and the third target track, when the third azimuth information is equal to the first azimuth information as comparative analysis results (S117).

That is, the fusion controller 130 (with reference to FIG. 2) may generate a fusion track using a RaDAR track located on the same azimuth line, when a LiDAR track classified as an unknown or a pedestrian does not exist in the candidate sector (S119). Accordingly, the fusion controller 130 (with reference to FIG. 2) may minimize an error range.

Figure 8:
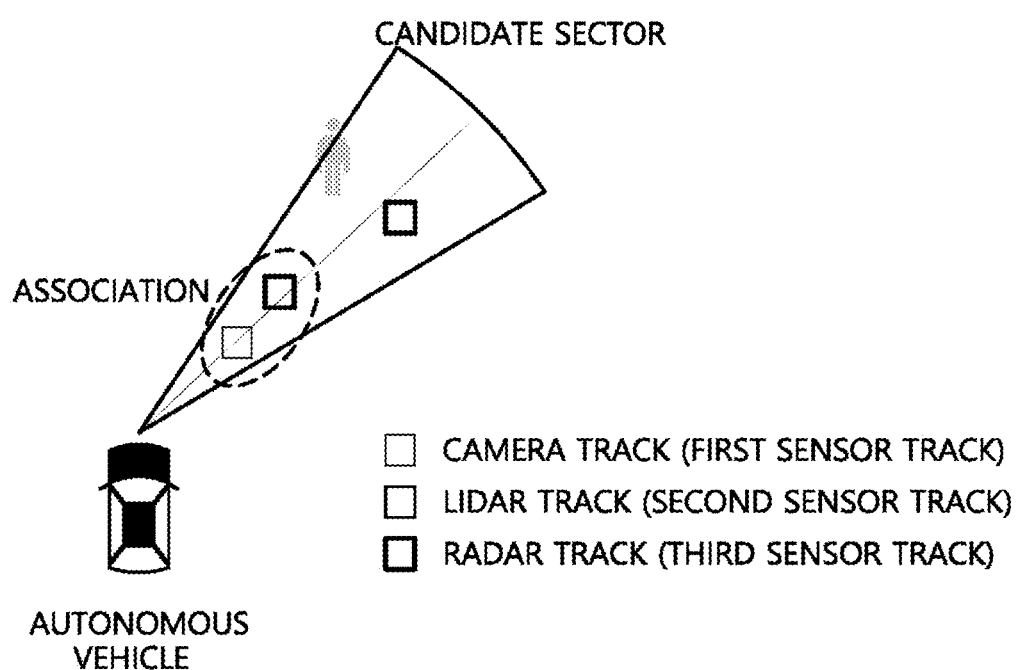

Further, the fusion controller 130 (with reference to FIG. 2) may analyze the third azimuth information calculated from the third target track and the fourth azimuth information calculated from the fourth target track through comparison with the first azimuth information, and may generate a fusion track based on the first sensor track, when the third azimuth information or the fourth azimuth information is not equal to the first azimuth information as the comparative analysis results. That is, the fusion controller 130 (with reference to FIG. 2) may generate the fusion track using the first sensor track, i.e., the camera track, alone, when no RaDAR track is located on the same azimuth line, as shown in FIG. 8 (S118).

As described above, the sensor information fusion method and apparatus according to embodiments of the present invention may form a candidate sector using only the azimuth information of a camera in order to minimize inaccuracy in position information acquired by the camera and RaDAR, and may perform association of camera, RaDAR and LiDAR tracks located inside the candidate sector, when a LiDAR target classified as a pedestrian or an unknown exists in the corresponding candidate sector, thereby being capable of improving accuracy in position, classification, and speed information of the pedestrian through fusion of LiDAR, RaDAR, and camera sensors with respect to the pedestrian.

The present invention described above may be implemented as computer readable code in a computer readable recording medium in which programs are recorded. Such computer readable recording media may include all kinds of recording media in which data readable by computer systems is stored. For example, the computer readable recording media may include a Hard Disk Drive (HDD), a Solid-State Drive (SSD), a Silicon Disk Drive (SDD), a ROM, a RAM, a CD-ROM, a magnetic tape, a floppy disk, an optical data storage device, etc.

As is apparent from the above description, a sensor information fusion method and apparatus according to embodiments of the present invention may form a candidate sector using only the azimuth information of a camera in order to minimize inaccuracy in position information acquired by the camera and RaDAR, and may perform association of camera, RaDAR, and LiDAR tracks located inside the candidate sector, when a LiDAR target classified as a pedestrian or an unknown exists in the corresponding candidate sector, thereby being capable of improving accuracy in position, classification, and speed information of the pedestrian through fusion of LiDAR, RaDAR, and camera sensors with respect to the pedestrian.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method comprising:
   receiving, by a first sensor mounted in a vehicle, a first sensor track;
   determining a reference sector as a region based on the first sensor track;
   selecting a plurality of target tracks included in the reference sector;
   determining a target track of the plurality of target tracks based on angles between the plurality of target tracks and the first sensor track; and
   generating a fusion track by combining the target track with the first sensor track.

2. The method according to claim 1, wherein determining the reference sector comprises:
   calculating first azimuth information from the first sensor track;
   extracting a resolution from the first azimuth information; and
   setting the reference sector based on the resolution.

3. The method according to claim 1, wherein selecting the plurality of target tracks comprises:
   receiving, by a second sensor different from the first sensor and mounted in the vehicle, a second sensor track;
   determining whether or not the second sensor track is located inside the reference sector; and
   setting the second sensor track as the plurality of target tracks in response to determining that the second sensor track is located inside the reference sector.

4. The method according to claim 3, wherein the plurality of target tracks comprises a first target track located inside the reference sector and a second target track located at a position different from the first target track inside the reference sector, and
   wherein generating the fusion track comprises:
      determining a first angle between the first target track and the first sensor track and a second angle between the second target track and the first sensor track, and
      generating a first fusion track by combining the first sensor track and the first target track or generating a second fusion track by combining the first sensor track and the second target track based on the determination.

5. The method according to claim 4, wherein generating the fusion track comprises generating the first fusion track by combining the first target track with the first sensor track based on determining that the first angle is less than the second angle.

6. The method according to claim 4, wherein generating the fusion track comprises generating the second fusion track by combining the second target track with the first sensor track based on determining that the first angle is greater than the second angle.

7. The method according to claim 4, wherein selecting the plurality of target tracks further comprises:
   requiring a third sensor track from a third sensor different from the second sensor,
   determining whether or not the third sensor track is located inside the reference sector, and setting the third sensor track as the plurality of target tracks in response to determining that the third sensor track is located inside the reference sector.

8. The method according to claim 7,
wherein the plurality of target tracks further comprises a third target track located inside the reference sector and a fourth target track located at a position different from the third target track inside the reference sector, and
wherein generating the fusion track further comprises:
determining a first distance between the third target track and the first target track and a second distance between the fourth target track and the first target track, and
generating a third fusion track by combining the first target track and the third target track or generating a fourth fusion track by combining the first target track and the fourth target track based on the determination.

9. The method according to claim 8, wherein generating the fusion track comprises generating the third fusion track by combining the third target track with the first target track based on determining that the first distance is less than the second distance.

10. The method according to claim 8, wherein generating the fusion track comprises generating the fourth fusion track by combining the fourth target track with the first target track based on determining that the first distance is greater than the second distance.

11. The method according to claim 7,
wherein the plurality of target tracks excludes the first target track and the second target track as not being located inside the reference sector,
wherein the plurality of target tracks comprises a third target track located inside the reference sector and a fourth target track located at a position different from the third target track inside the reference sector, and
wherein generating the fusion track further comprises:
determining third azimuth information calculated from the third target track and fourth azimuth information calculated from the fourth target track through comparison between first azimuth information calculated from the first sensor track and each of the third azimuth information and the fourth azimuth information, and
generating a fifth fusion track by combining the first sensor track and the third target track based on determining that the third azimuth information is equal to the first azimuth information.

12. The method according to claim 7,
wherein the plurality of target tracks excludes the first target track and the second target track as not being located inside the reference sector,
wherein the at least one plurality of target tracks comprises a third target track located inside the reference sector and a fourth target track located at a position different from the third target track inside the reference sector, and
wherein generating the fusion track further comprises:
determining third azimuth information calculated from the third target track and fourth azimuth information calculated from the fourth target track through comparison between first azimuth information calculated from the first sensor track and each of the third azimuth information and the fourth azimuth information, and
generating the fusion track based on the first sensor track and based on determining that the third azimuth information or the fourth azimuth information is not equal to the first azimuth information.

13. A non-transitory computer readable recording medium storing a program including program instructions that, when executed by one or more processors, cause the one or more processors to perform the method according to claim 1.

14. A sensor apparatus comprising:
a first sensor configured to receive a first sensor track with respect to an object adjacent to a vehicle; and
a controller configured to:
determine a reference sector based on the first sensor track provided by the first sensor;
select a plurality of target tracks included in the reference sector;
determine a target track of the plurality of target tracks based on angles between the plurality of target tracks and the first sensor track; and
generate a fusion track by combining the target track with the first sensor track.

15. The sensor apparatus according to claim 14, wherein the controller is configured to:
calculate first azimuth information from the first sensor track;
extract a resolution from the first azimuth information; and
set the reference sector based on the resolution.

16. The sensor apparatus according to claim 14, further comprising:
a second sensor configured to receive a second sensor track with respect to the object adjacent to the vehicle; and
a third sensor configured to receive a third sensor track with respect to the object adjacent to the vehicle,
wherein the controller is configured to:
determine whether or not at least one of the second sensor track or the third sensor track is located inside the reference sector; and
set the second sensor track or the third sensor track as the plurality of target tracks in response to determining that the second sensor track or the third sensor track is located inside the reference sector.

17. The sensor apparatus according to claim 16,
wherein the plurality of target tracks comprises a first target track located inside the reference sector and a second target track located at a position different from the first target track inside the reference sector, and
wherein the controller is configured to:
determine a first angle between the first target track and the first sensor track and a second angle between the second target track and the first sensor track; and
generate a first fusion track by combining the first sensor track and the first target track or generate a second fusion track by combining the first sensor track and the second target track based on the determination.

18. The sensor apparatus according to claim 17,
wherein the plurality of target tracks further comprises a third target track located inside the reference sector and a fourth target track located at a position different from the third target track inside the reference sector, and
wherein the controller is configured to:
determine a first distance between the third target track and the first target track and a second distance between the fourth target track and the first target track; and
generate a third fusion track by combining the first target track and the third target track or generate a fourth fusion track by combining the first target track and the fourth target track based on the determination.

19. The sensor apparatus according to claim 17, wherein the plurality of target tracks excludes the first target track and the second target track as not being located inside the reference sector,
wherein the plurality of target tracks comprises a third target track located inside the reference sector and a fourth target track located at a position different from the third target track inside the reference sector, and
wherein the controller is configured to:
  determine third azimuth information calculated from the third target track and fourth azimuth information calculated from the fourth target track through comparison between first azimuth information calculated from the first target track and each of the third azimuth information and the fourth azimuth information, and
  generate a fifth fusion track by combining the first sensor track and the third target track based on determining that the third azimuth information is equal to the first azimuth information.

20. The sensor apparatus according to claim 17, wherein the plurality of target tracks excludes the first target track and the second target track as not being located inside the reference sector,
wherein the plurality of target tracks comprises a third target track located inside the reference sector and a fourth target track located at a position different from the third target track inside the reference sector, and
wherein the controller is configured to:
  determine third azimuth information calculated from the third target track and fourth azimuth information calculated from the fourth target track through comparison between first azimuth information calculated from the first target track and each of the third azimuth information and the fourth azimuth information, and
  generate the fusion track based on the first sensor track and based on determining that the third azimuth information or the fourth azimuth information is not equal to the first azimuth information.

* * * * *